US009704300B2

United States Patent
Reda et al.

(10) Patent No.: US 9,704,300 B2
(45) Date of Patent: Jul. 11, 2017

(54) DETECTION OF ANATOMY ORIENTATION USING LEARNING-BASED REGRESSION

(71) Applicant: Siemens Medical Solutions USA, Inc., Malvern, PA (US)

(72) Inventors: Fitsum Aklilu Reda, West Chester, PA (US); Yiqiang Zhan, Berwyn, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 21 days.

(21) Appl. No.: 15/046,900

(22) Filed: Feb. 18, 2016

(65) Prior Publication Data

US 2016/0260213 A1    Sep. 8, 2016

Related U.S. Application Data

(60) Provisional application No. 62/129,161, filed on Mar. 6, 2015.

(51) Int. Cl.
*G06T 19/20* (2011.01)
*G06K 9/46* (2006.01)
*G06T 7/73* (2017.01)

(52) U.S. Cl.
CPC .......... *G06T 19/20* (2013.01); *G06K 9/4614* (2013.01); *G06T 7/73* (2017.01); *G06T 2200/04* (2013.01); *G06T 2207/10072* (2013.01); *G06T 2207/20081* (2013.01); *G06T 2207/30004* (2013.01); *G06T 2210/41* (2013.01); *G06T 2219/2016* (2013.01)

(58) Field of Classification Search
USPC ................. 382/128, 154–155, 159
See application file for complete search history.

(56) References Cited

U.S. PATENT DOCUMENTS

| 5,408,511 | A | * | 4/1995 | Grangeat | G06T 11/006 250/363.02 |
|---|---|---|---|---|---|
| 5,444,792 | A | * | 8/1995 | Grangeat | G06T 11/006 382/131 |
| 8,068,654 | B2 | * | 11/2011 | Barbu | G06K 9/00201 345/419 |
| 8,116,548 | B2 | * | 2/2012 | Zheng | G06K 9/3233 382/131 |

(Continued)

OTHER PUBLICATIONS

Viola, Paul, and Michael Jones. "Rapid object detection using a boosted cascade of simple features." Computer Vision and Pattern Recognition, 2001. CVPR 2001. Proceedings of the 2001 IEEE Computer Society Conference on. vol. 1. IEEE, 2001.

(Continued)

*Primary Examiner* — Ishrat I Sherali (57) ABSTRACT

A framework for anatomy orientation detection is described herein. In accordance with one aspect, a pre-trained regressor is applied to appearance features of the image volume to predict a colatitude of the structure of interest. An optimal longitude corresponding to the predicted colatitude is then determined. In response to the colatitude being more than a pre-determined threshold, the image volume is re-oriented based on the predicted colatitude and the optimal longitude, and the predicted colatitude and optimal longitude determination is repeated for the re-oriented image volume.

20 Claims, 9 Drawing Sheets

(56) References Cited

U.S. PATENT DOCUMENTS

| | | | | |
|---|---|---|---|---|
| 8,150,212 B2* | 4/2012 | Wang | ............... | G06K 9/3208 |
| | | | | 382/289 |
| 8,634,616 B2* | 1/2014 | Den Harder | ......... | G06K 9/3233 |
| | | | | 382/128 |
| 9,429,418 B2* | 8/2016 | Mitarai | ............... | G01B 11/03 |
| 2003/0112921 A1* | 6/2003 | Lang | ............... | A61B 6/505 |
| | | | | 378/54 |
| 2014/0093153 A1* | 4/2014 | Sofka | ............... | G06T 7/0014 |
| | | | | 382/131 |

OTHER PUBLICATIONS

Breiman, Leo. "Random forests." Machine learning 45.1 (2001): 5-32.

\* cited by examiner

DETECTION OF ANATOMY ORIENTATION USING LEARNING-BASED REGRESSION

CROSS-REFERENCE TO RELATED APPLICATION

The present application claims the benefit of U.S. provisional application No. 62/129,161 filed Mar. 6, 2015, the entire contents of which are herein incorporated by reference.

TECHNICAL FIELD

The present disclosure generally relates to image data processing, and more particularly to detection of anatomy orientation in image data.

BACKGROUND

The field of medical imaging has seen significant advances since the time X-Rays were first used to determine anatomical abnormalities. Medical imaging hardware has progressed in the form of newer machines such as Magnetic Resonance Imaging (MRI) scanners, Computed Axial Tomography (CAT) scanners, etc. Because of the large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2D") image made of pixel elements or a three-dimensional ("3D") image made of volume elements ("voxels"). Such 2D or 3D images are processed using medical image recognition techniques to determine the presence of anatomical structures such as cysts, tumors, polyps, etc. Given the amount of image data generated by any given image scan, it is preferable that an automatic technique should point out anatomical features in the selected regions of an image to a doctor for further diagnosis of any disease or condition.

Two fundamental questions frequently asked during medical image interpretation are: (1) "Where is the anatomical structure?" and (2) "What is the orientation of the anatomical structure?" "Anatomy orientation" generally refers to one or more intrinsic directions of an anatomical structure. These directions may be defined by local landmarks or global organ shapes, and are consistent across the population.

Early studies of anatomy orientation detection often exploit prior knowledge of specific anatomies. For example, template matching that relies on the Matched Filter Theorem or eigenanalysis of Hessian matrix has been widely used to determine local vessel orientation and perform tracing. These methods are dependent on strong priors of the anatomy under study, and do not generalize to other anatomies, such as the heart or the vertebral-column.

From another perspective, machine learning technologies have revolutionized the landscape of medical image analysis. In the areas of anatomy detection or segmentation, learning-based approaches have provided a generic solution for different organs in different modalities. However, learning technologies in detecting anatomy orientation remain under-explored.

SUMMARY

Described herein are systems and methods for anatomy orientation detection. In accordance with one aspect, a pre-trained regressor is applied to appearance features of the image volume to predict a colatitude of the structure of interest. An optimal longitude corresponding to the colatitude may then be determined. In some implementations, the optimal longitude is determined by uniformly sampling a set of longitudes at the predicted colatitude, re-orienting the image volume to each sampled longitude, and applying the pre-trained regressor to each re-oriented image volume to predict a relative colatitude. The longitude with the smallest relative colatitude may then be selected to be the optimal longitude. In response to the predicted colatitude being more than a pre-determined threshold, the image volume is re-oriented based on the predicted colatitude and the optimal longitude, and the colatitude and optimal longitude determination steps are repeated for the re-oriented image volume.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displays as a 2D image from some angle of view.

Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

Figure 1:
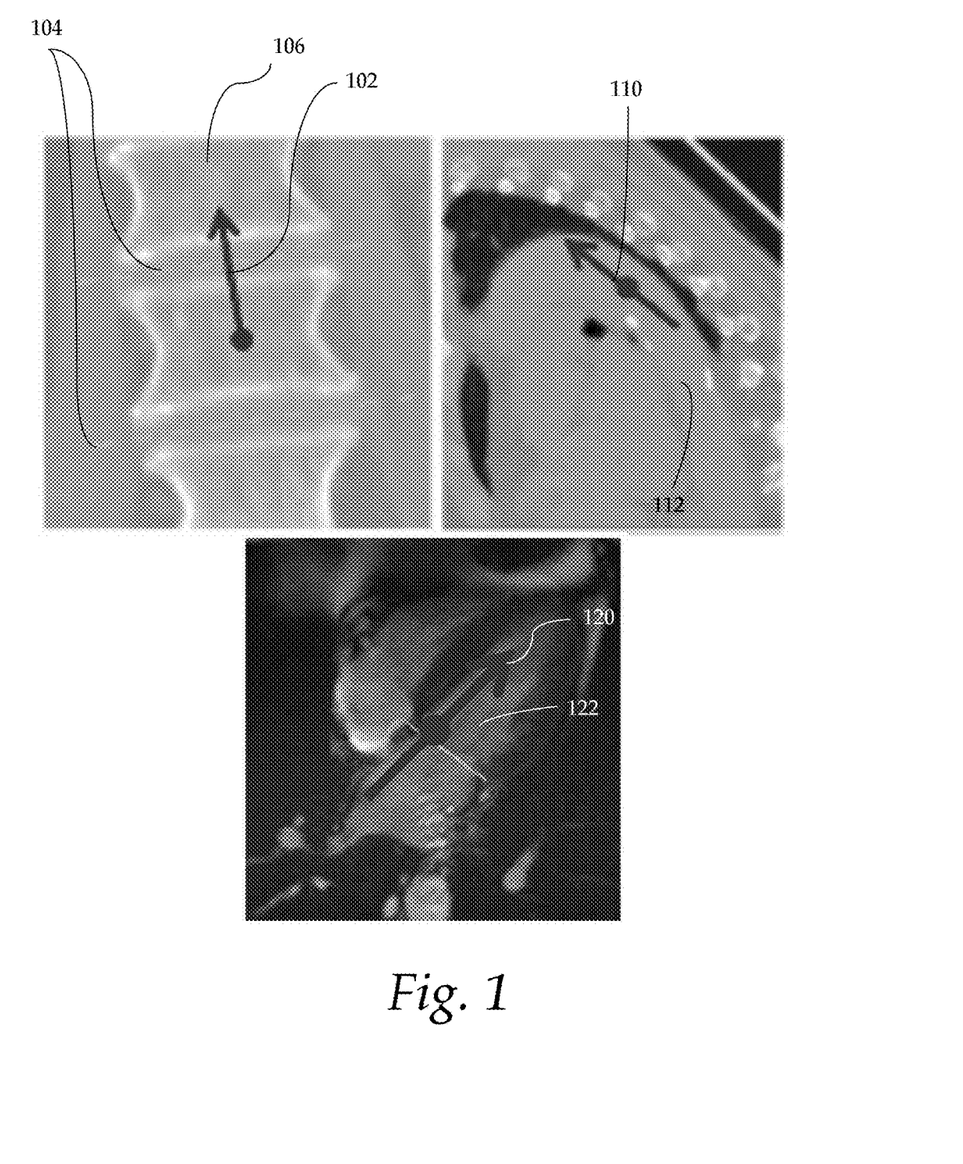
FIG. 1 shows various examples of anatomy orientations.

Anatomical structures have intrinsic orientations along one or more directions. FIG. 1 shows various examples of anatomy orientations. In one example, an anatomy orientation 102 of a vertebral column 106 is shown. The anatomy orientation 102 is the normal direction of the intervertebral discs 104 in the intervertebral column 106. In another example, the anatomy orientation 110 of an aorta segment 112 is shown. The anatomy orientation 110 is the tangent direction of a point along an aorta centerline. In yet another example, the anatomy orientation 120 is the base-to-apex direction of the heart 122 in the MR image. The ability to automatically detect anatomy orientation will not only benefit various clinical use cases (e.g., automatic MR scan planning), but will also pave ways to other high-level medical image analysis tasks. For example, predicting a local vessel orientation is a fundamental task for tracing algorithms.

The present framework automatically detects anatomy orientation in a robust and efficient way. One aspect of the present framework uses a regression paradigm for efficient detection of anatomy orientation in a generic fashion (i.e., across modalities and organ systems). In contrast to classification, regression methods directly estimate the most probable hypothesis (e.g., anatomy orientation) without exhaustively testing the hypothesis space. An orientation regressor may learn a mapping function to directly predict an orientation, which may be a multi-variate (three in 3-D and two in 2-D) latent variable in a Cartesian coordinate system. However, since it is less complex to learn a regressor for a single-variate than a multi-variate latent variable, the present framework learns a regressor for a colatitude in a spherical (or polar) coordinate system (i.e. a mapping function for a single-variate latent variable). The regressor may be used to model the highly non-linear mapping between appearance features (e.g., Haar-like features) and the anatomy colatitude.

The colatitude alone may not be enough to determine anatomy orientation. The longitude also needs to be determined. In accordance with another aspect of the present framework, an efficient searching scheme is used to determine an optimal longitude. The search scheme iteratively re-orients the image volume and invokes the regressor to predict relative colatitudes until longitude ambiguity is eliminated. In accordance with yet another aspect, a rotation-invariant integral image is used to efficiently calculate appearance features at any orientation. More particularly, a spherical coordinates-based integral image may be used to efficiently extract Haar-like features at any orientation.

The present framework is highly scalable to different organ systems and imaging modalities. The framework was validated in three diverse applications: (1) vertebral column tracing in CT; (2) aorta tracing in CT; and (3) spinal cord tracing in MRI. In all applications (tested on a total of 400 scans), the framework achieved a success rate above 90%.

Experimental results suggest that the present framework is fast, robust and accurate. These and other advantages and features will be described in more details herein.

Figure 2:
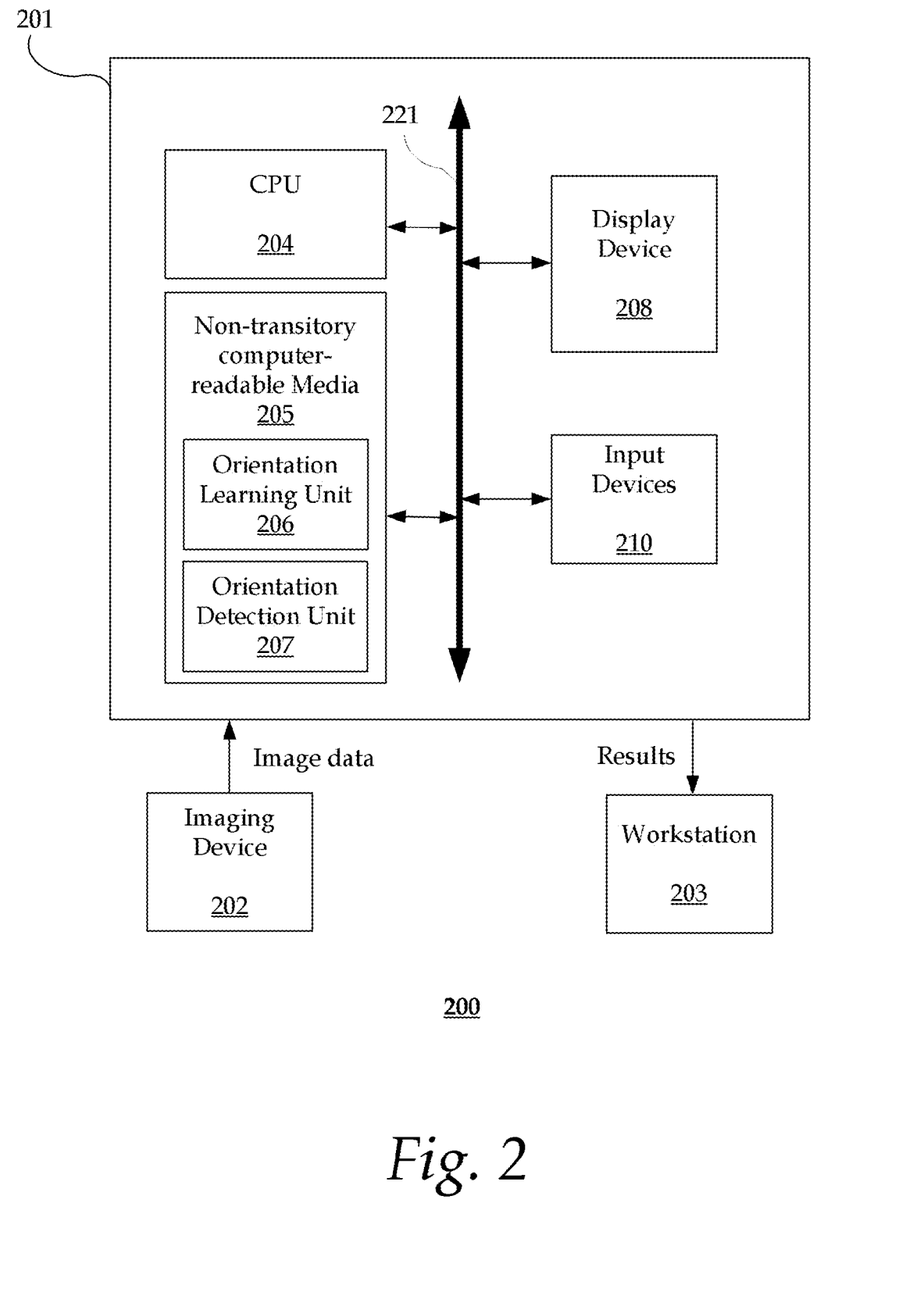
FIG. 2 is a block diagram illustrating an exemplary system.

FIG. 2 is a block diagram illustrating an exemplary system 200. The system 200 includes a computer system 201 for implementing the framework as described herein. In some implementations, computer system 201 operates as a standalone device. In other implementations, computer system 201 may be connected (e.g., using a network) to other machines, such as imaging device 202 and workstation 203. In a networked deployment, computer system 201 may operate in the capacity of a server (e.g., thin-client server, such as Syngo.Via® by Siemens Healthcare), a Client User machine in server-client user network environment, or as a peer machine in a peer-to-peer (or distributed) network environment.

In one implementation, computer system 201 comprises a processor or central processing unit (CPU) 204 coupled to one or more non-transitory computer-readable media 205 (e.g., computer storage or memory), display device 208 (e.g., monitor) and various input devices 210 (e.g., mouse or keyboard) via an input-output interface 221. Computer system 201 may further include support circuits such as a cache, a power supply, clock circuits and a communications bus. Various other peripheral devices, such as additional data storage devices and printing devices, may also be connected to the computer system 201.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 205. In particular, the present techniques may be implemented by an orientation learning unit 206 and an orientation detection unit 207. Non-transitory computer-readable media 205 may include random access memory (RAM), read-only memory (ROM), magnetic floppy disk, flash memory, and other types of memories, or a combination thereof. The computer-readable program code is executed by CPU 204 to process images or image data acquired by, for example, imaging device 202. As such, the computer system 201 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 205 may be used for storing image datasets, knowledge base, individual patient data, database of previously treated patients (e.g., training data), and so forth. Such data may also be stored in external storage or other memories. The external storage may be implemented using a database management system (DBMS) managed by the CPU 204 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 202 may be a radiology scanner, such as an X-ray or a CT scanner, for acquiring image data. The workstation 203 may include a computer and appropriate peripherals, such as a keyboard and display device, and can be operated in conjunction with the entire system 200. For example, the workstation 203 may communicate with the imaging device 202 so that the image data collected by the imaging device 202 can be rendered at the workstation 203 and viewed on a display device.

The workstation 203 may communicate directly with the computer system 201 to display processed image data and/or output image processing results (e.g., orientation of anatomical structure). The workstation 203 may include a graphical user interface to receive user input via an input device (e.g., keyboard, mouse, touch screen voice or video recognition interface, etc.) to manipulate visualization and/or processing of the image data. For example, the user may view the processed image data, and specify one or more view adjustments or preferences (e.g., zooming, panning, rotating, changing contrast, changing color, changing view angle, changing view depth, changing rendering or reconstruction technique, etc.), navigate to a particular region of interest by specifying a "goto" location, and so forth.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 3A:
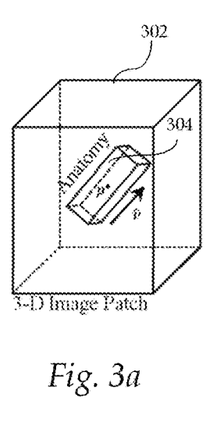
FIGS. 3a-d illustrate an exemplary problem definition and orientation space.

FIGS. 3a-d illustrate an exemplary problem definition and orientation space used by the present framework. FIG. 3a shows a 3D image patch $\wp$ (302) containing an anatomical structure (or anatomy) of interest (304). The framework seeks to determine the anatomy orientation $\hat{v}$ using appearance features. The anatomical structure 304 may be assumed to be roughly located at the center of the patch 302. This can be achieved by anatomy detection algorithms or manual operators.

Figure 3B:
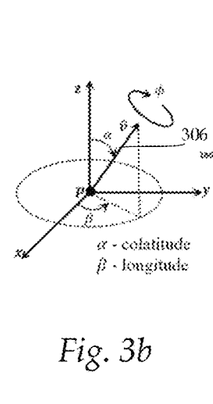

As shown in FIG. 3b, the anatomy orientation $\hat{v}$ (306) may be parameterized as $(\alpha, \beta)$, where $\alpha \in [0°, 90°]$ is the colatitude, which is the complement of the latitude or the angle measured from the positive z-axis (North Pole), and $\beta \in [0°, 360°)$ is the longitude, which is the counter-clockwise angle in the xy-plane measured from the positive x-axis. The degree-of-freedom $\phi$ describes the anatomy's spinning around its own axis. After is determined, the prediction of the degree-of-freedom $\phi$ is a 2D orientation detection problem, which can also be solved by the present framework. It should be appreciated that the present framework is applicable for both 2D and 3D orientations. In the context of 2D orientation, the rotation-invariant integral image is built on polar coordinates, while spherical coordinates may be used for 3D orientation. The efficient search strategy is less important in 2D, since 2D orientations are described by one variable (the polar angle).

Figure 3C:
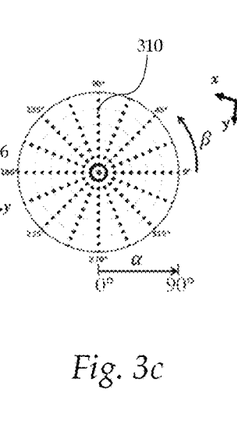
Figure 3D:
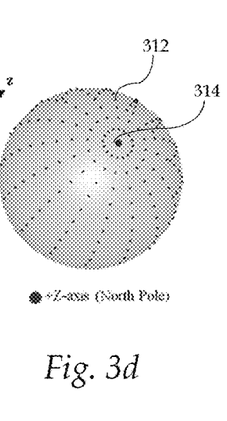

FIG. 3c shows the 3D orientation space $(\alpha, \beta)$ plotted in a 2-D polar system, with $\alpha$ as the radius and $\beta$ as the angle measured from the polar axis. Each black dot 310 denotes a hypothesis in the orientation space. FIG. 3d shows the corresponding 3D orientation space 312, in which the dot 314 denotes the North Pole.

To achieve a generic solution, a learning-based approach may be used to predict anatomy orientation. One type of learning-based approach is marginal space learning (MSL), which formulates the detection of anatomy orientation as a classification problem. This technique uses a classification model trained to detect a desired orientation. During testing, it uniformly samples the orientation space and performs an exhaustive test, which induces significant computational cost. The prediction of the optimal anatomy orientation $(\alpha, \beta)_{opt}$ may be formulated as a classification problem such as follows:

$$(\alpha, \beta)_{opt} = \underset{\alpha \in [0°, 90°], \beta \in [0°, 360°]}{\operatorname{argmax}} C(\mathcal{P}_{\alpha,\beta}) \qquad (1)$$

wherein $\mathcal{P}_{\alpha,\beta}$ is the original patch $\mathcal{P}$ rotated by $(\alpha, \beta)$, and $C(\mathcal{P}_{\alpha,\beta})$ is a pre-trained classifier that maps the patch $\mathcal{P}_{\alpha,\beta}$ to a score which indicates if the anatomy orientation within the patch is along the desired direction. As shown in Equation (1), at run-time, each $(\alpha,\beta)$ hypothesis needs to be evaluated by $C(\bullet)$ and the hypothesis that maximizes the score is the predicted anatomy orientation. Assuming the orientation space is quantized into a 1° resolution, Equation (1) needs to evaluate 32,400 (360×90) hypotheses, which induces a significant computational cost.

To achieve efficient orientation detection, the present framework is based on a regression paradigm. The prediction of anatomy orientation $(\alpha, \beta)_{opt}$ is formulated as follows:

$$(\alpha, \beta) = R(\mathcal{P}) \qquad (2)$$

wherein $R(\bullet)$ is the pre-trained regressor (or predictor) and $\mathcal{P}$ is the image volume patch. At run-time, the pre-trained regressor $R(\bullet)$ evaluates $\mathcal{P}$ only once to estimate orientation. Compared to the classification paradigm, which uses an exhaustive test, the regression-based method has an immense potential for run-time efficiency.

Figure 4:
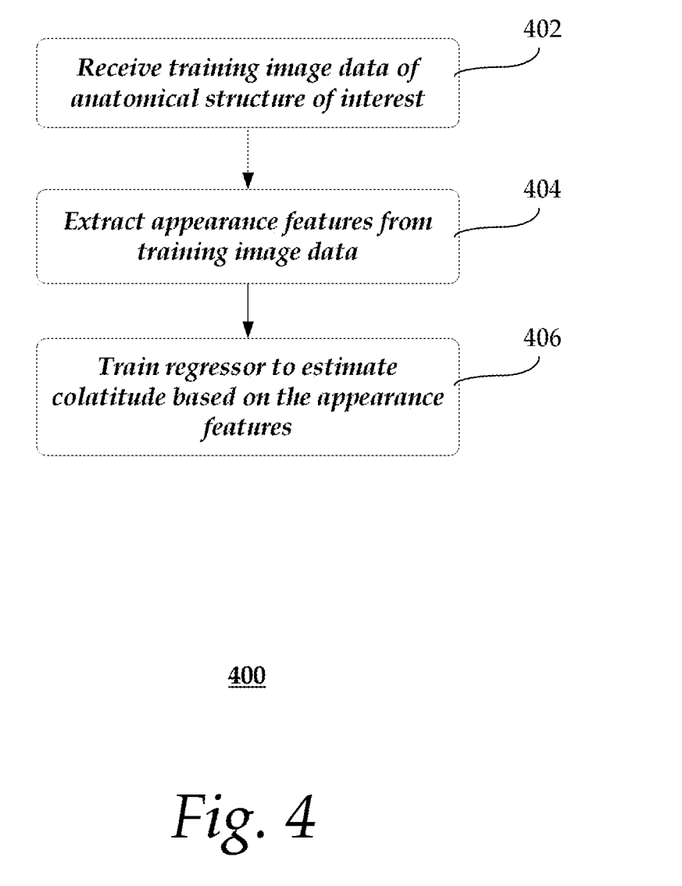
FIG. 4 shows an exemplary method of orientation learning.

FIG. 4 shows an exemplary method 400 of orientation learning performed by a computer system. It should be understood that the steps of the method 400 may be performed in the order shown or a different order. Additional, different, or fewer steps may also be provided. Further, the method 400 may be implemented with the system 201 of FIG. 2, a different system, or a combination thereof.

At 402, orientation learning unit 206 receives training image data of an anatomical structure of interest. The training image data may be acquired using techniques such as magnetic resonance (MR) imaging, computed tomography (CT), helical CT, X-ray, angiography, positron emission tomography (PET), fluoroscopy, ultrasound, single photon emission computed tomography (SPECT), or a combination thereof. The structure of interest may be any biological object identified for investigation or examination, such as a portion of a patient's or subject's brain, heart, spine, vertebra, blood vessel, aorta, and so forth. The training image data may include a set of 3D image patches, such as those described with reference to FIG. 3a.

At 404, orientation learning unit 206 extracts appearance (or visual) features from the training image data. Appearance features are variables that can be observed from the image data. In some implementations, the orientation learning unit 206 extracts Haar-like features from the training image data. A Haar-like feature includes a cuboid that may be computed using an integral image, which is defined as a two-dimensional lookup table in the form of a matrix with the same size as the original image. A simple rectangular Haar-like feature can be defined as the difference of the sum of pixels of areas inside the rectangle, which can be at any position and scale within the original image. This difference is then used to categorize subsections of an image. See, for example, P. Viola and M. Jones, *Rapid object detection using a boosted cascade of simple features*, Proc. IEEE CVPR 2001, at 1-511, which is herein incorporated by reference. It should be understood that other types of appearance features may also be extracted.

At 406, orientation learning unit 206 trains a regressor (or regression-based predictor) based on the appearance features of $\mathcal{P}$ to estimate anatomy colatitude. In some implementations, random forests (RF) are selected as the regressor. The regressor is pre-trained by training random forests. Since RF comprises a set of non-linear decision trees with feature selection capability, it is able to model the highly non-linear mapping between appearance features (observable variables) and anatomy orientation $(\alpha, \beta)$ (latent variables). The regressand may be simplified from the orientation vector $(\alpha, \beta)$ to the colatitude variable $\alpha$. This strategy is designed for two reasons. First, a single-regressand mapping function is usually less complex to learn than a multi-regressand mapping function. Second, since the longitude $\beta$ is a circular variable, the longitude statistics required by standard RF training cannot be calculated in a trivial way.

The colatitude regressor can be described as $$\alpha = RF(\mathcal{F}(\mathcal{P})) \qquad (3)$$

wherein RF denotes a trained regression forest, and $\mathcal{F}(\mathcal{P})$ denotes the appearance features of $\mathcal{P}$. As discussed previously, the appearance features may include Haar-like features that comprise one or multiple cuboids. These features are automatically selected in the regression forest training stage. The regression forest may be trained in accordance with methods suggested in, for example, L. Breiman, *Random Forests*, 45 (1) Machine Learning, 5-32, (2001), which is herein incorporated by reference.

Since the pre-trained regressor predicts only anatomy colatitude (see Equation (3)), it still cannot provide a complete 3D anatomy orientation. To address this problem, an iterative algorithm is used to exploit a unique property of the 3D orientation space, which indicates that all longitudes converge at the North Pole or South Pole. In other words, as shown in FIG. 3c, the smaller the colatitude, the less the ambiguity of 3-D orientations with respect to different longitudes. For example, while orientations on the equator (colatitude=90°) vary a lot with different longitudes, the orientation at the North Pole (colatitude=0°) is not affected by longitude at all. Accordingly, the present framework iteratively performs colatitude prediction and image volume reorientation until the predicted colatitude from the reoriented image volume is close to zero, i.e., until the orientation ambiguity from the unknown longitude is eliminated. More details of this iterative framework are described with reference to method 500 of FIG. 5.

Figure 5:
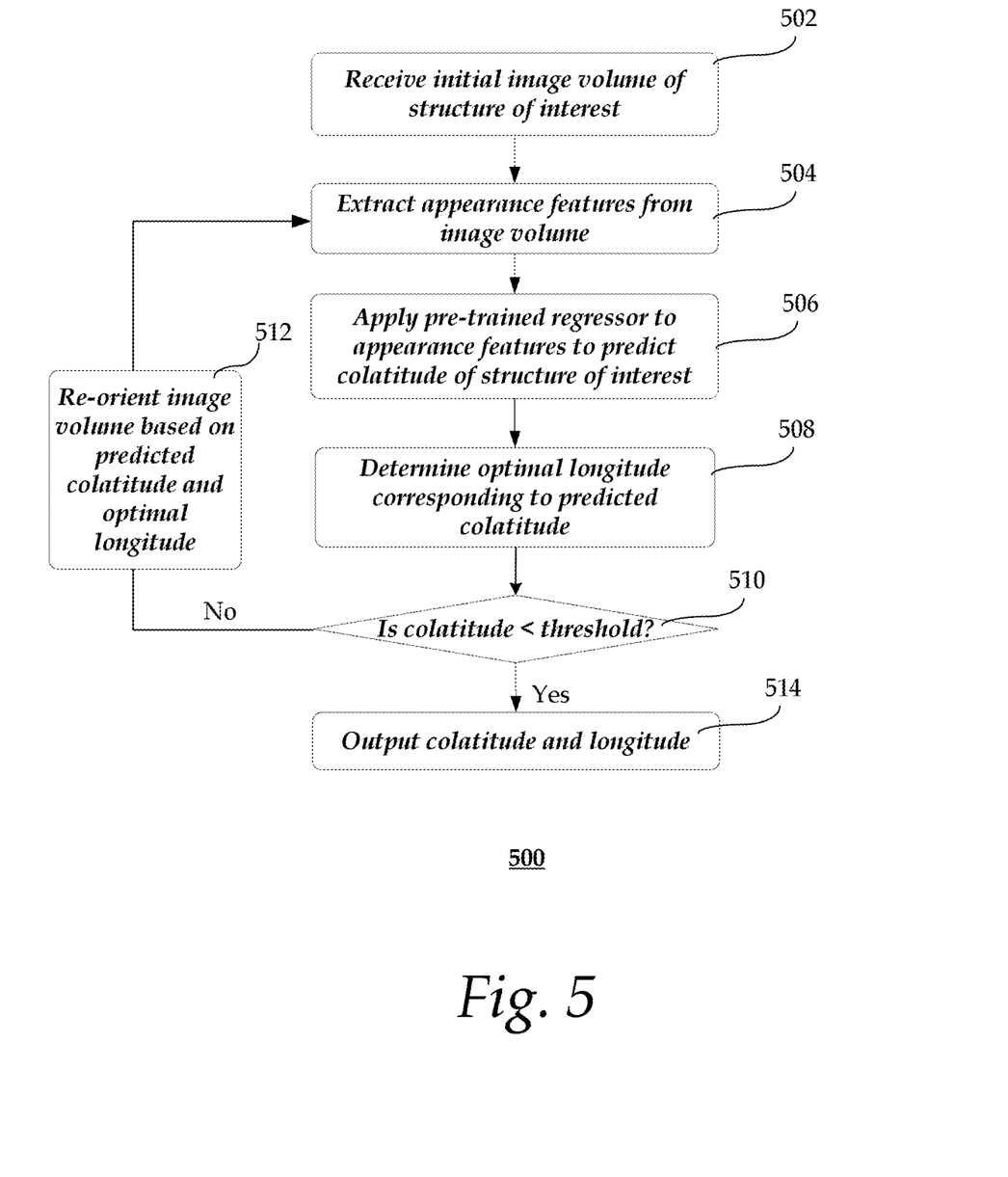
FIG. 5 shows an exemplary method of orientation detection performed during runtime.

FIG. 5 shows an exemplary method 500 of orientation detection performed during runtime by a computer system. It should be understood that the steps of the method 500 may be performed in the order shown or a different order. Additional, different, or fewer steps may also be provided. Further, the method 500 may be implemented with the system 201 of FIG. 2, a different system, or a combination thereof.

At 502, orientation detection unit 207 receives the initial image volume of the anatomical structure of interest. The image volume may be acquired by, for example, imaging device 202 from the subject or patient currently undergoing diagnosis or treatment. The image volume may be acquired using techniques such as magnetic resonance (MR) imaging, computed tomography (CT), helical CT, X-ray, angiography, positron emission tomography (PET), fluoroscopy, ultrasound, single photon emission computed tomography (SPECT), or a combination thereof. The image volume may be a 3D image with the anatomical structure of interest located substantially at the center. The anatomical structure of interest may be any biological object identified for investigation or examination, such as at least a portion of a patient's or subject's brain, heart, spine, vertebra, blood vessel, and so forth At 504, orientation detection unit 207 extracts appearance features from the image volume. As discussed previously, such appearance features may include Haar-like features, which can be efficiently extracted using an integral image. However, since method 500 involves iterative colatitude prediction and image volume re-orientation, the integral image needs to be recalculated since it is not rotationally invariant. To speed-up this computationally expensive task, a rotation-invariant integral image may be built based on the spherical (or polar) coordinate system.

Figure 6A:
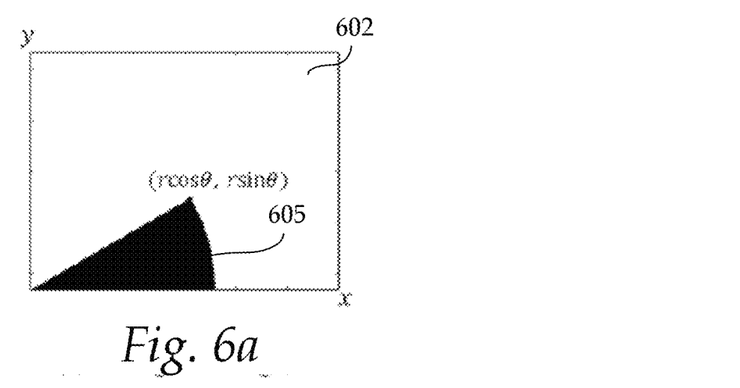
FIGS. 6a-c illustrate an exemplary rotation-invariant image in two dimensions.
Figure 6B:
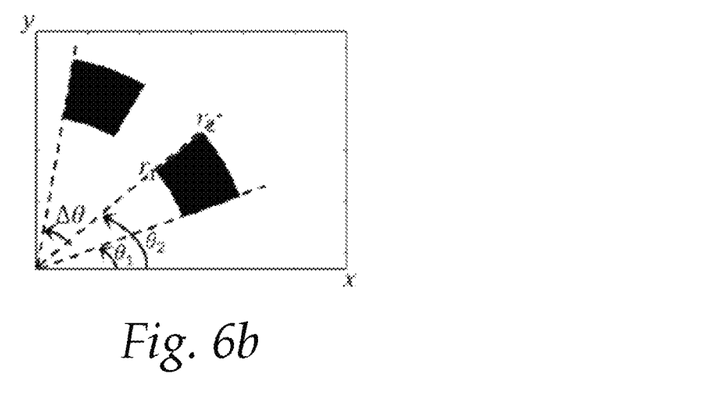
Figure 6C:
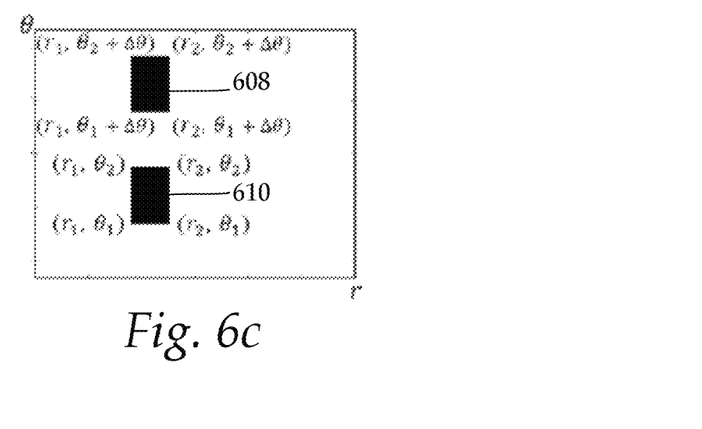

FIGS. 6a-c illustrate an exemplary rotation-invariant integral image in two dimensions. More particularly, FIG. 6a represents the original image I in a Cartesian coordinate system, while FIG. 6b represents exemplary Haar-like elements (A and A') in the original image I in a Cartesian coordinate system, and FIG. 6c represents the corresponding Haar-like elements (608 and 610) in the integral image in a polar coordinate system. Given a 2-D image I (shown as 602 in FIG. 6a), its corresponding integral image II can be built based on the polar-coordinate system as follows:

$$II(r,\theta) = \Sigma_{r'<r,\theta'<\theta} I(r'\cos\theta', r'\sin\theta') \quad (4)$$

wherein $II(r,\theta)$, is equal to the sum of the intensities within the sector 605 in FIG. 6a. The basic element of Haar-like features, i.e., the sum of the intensity within a circular trapezoid (shown as A in FIG. 6b) (approximation of a rectangle), can be quickly calculated using four entries in the integral image II as, $$A = II(r_2,\theta_2) + II(r_1,\theta_1) - II(r_2,\theta_1) - II(r_1,\theta_2) \quad (5)$$

To calculate the same for a rotated Haar element A' (rotated by $\Delta\theta$), instead of re-computing the integral image II, we only change the coordinates of the four entries in the integral image ii as follows:

$$A' = II(r_2,\theta_2+\Delta\theta) + II(r_1,\theta_1+\Delta\theta) - II(r_2,\theta_1+\Delta\theta) - II(r;\theta_2+\Delta\theta) \quad (6)$$

Eq. 5 and Eq. 6 show the "rotation-invariant" property of the polar coordinate system-based integral image. The same integral image can be reused to calculate Haar-like features at any orientation. In addition, the same principle can be extended to 3-D using the spherical coordinate system.

Returning to FIG. 5, at 506, orientation detection unit 207 applies the pre-trained regressor to the extracted appearance features to predict colatitude of the anatomical structure. The pre-trained regressor may be trained by, for example, method 400 described with reference to FIG. 4.

FIGS. 7a-d illustrate an efficient search scheme using iterative colatitude prediction and volume re-orientation approach. A patch or image volume rotated by $(\alpha,\beta)$ is denoted as $\wp_{\alpha,\beta}$, where $\wp_{\alpha_0,\beta_0}$ ($\alpha_0=0°$, $\beta_0=0°$ 702 is the original patch. The dot 706 in FIG. 7a denotes the ground truth of the anatomy orientation in $\wp_{\alpha_0,\beta_0}$. The anatomy colatitude $\alpha_1 = RF(\mathcal{F}(\wp_{\alpha_0,\beta_0}))$ (708) may be predicted by applying the pre-trained regressor (or predictor) to the extracted appearance features, which narrows down the orientation hypothesis to the circle 708. Due to possible prediction errors, the narrowed hypothesis may not include the ground truth (whose colatitude is $\hat{\alpha}_0$).

Returning to FIG. 5, at 508, orientation detection unit 207 determines the optimal longitude corresponding to the predicted colatitude. In some implementations, the optimal longitude is determined by uniformly sampling a set of longitudes at the predicted colatitude, re-orienting the image volume to each of the sampled longitude to generate re-oriented image volumes, and applying the pre-trained regressor to each re-oriented image volume to predict a relative colatitude. The sampled longitude with the smallest relative colatitude is then selected as the optimal longitude.

Figure 7A:
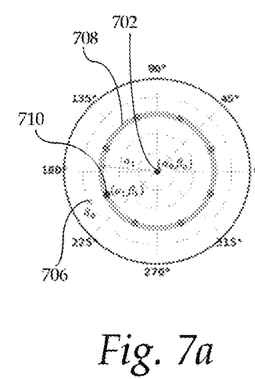
FIGS. 7a-d illustrate an efficient search scheme using iterative colatitude prediction and volume re-orientation approach.
Figure 7B:
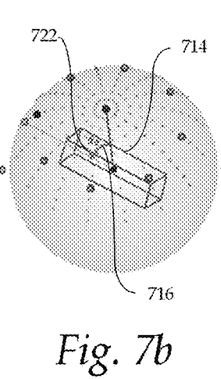
Figure 7C:
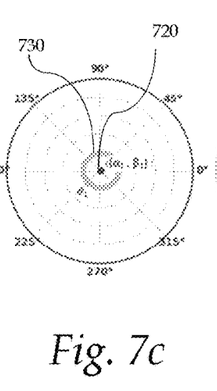
Figure 7D:
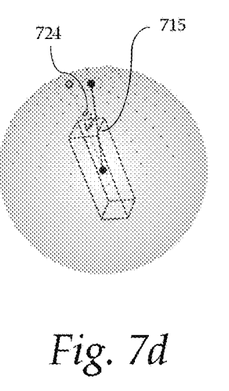

More particularly, as shown in FIG. 7a, to determine the optimal longitude, a set of M uniformly spread longitude hypotheses (denoted as points) are first sampled in the orientation hypothesis space 708 to further reduce the size of the hypothesis space. All longitude hypotheses in the orientation hypothesis space 708 have the same colatitude. For each sampled longitude, the volume is re-oriented to the sampled longitude, and a relative colatitude is predicted by applying the pre-trained regressor to the appearance features extracted from the re-oriented volume. The optimal longitude is determined to be the sampled longitude for which the relative colatitude is the smallest.

Intuitively, the "best" hypothesis (represented by point 710) should be the one that is closest to the ground truth (point 706), i.e., the hypothesis with the minimum relative colatitude to the ground truth. The optimal longitude $\beta_1$ determination may be defined by the following expression:

$$\beta_{i+1} = \underset{\{\beta_{i,j}|j=1,...,M\}}{\operatorname{argmin}} RF(\mathcal{F}(\wp_{\alpha_{i+1},\beta_{i,j}})) \quad (7)$$

In other words, the optimal longitude is determined by selecting the hypothesis with the minimum relative colatitude to the desired orientation (or the sought-for orientation).

Returning to FIG. 5, at 510, orientation detection unit 207 determines whether the predicted colatitude is less than a predetermined threshold. When the predicted colatitude is less than a small threshold (i.e., substantially close to zero), the orientation ambiguity from the unknown longitude is eliminated. If the colatitude is not less than a small threshold, the method 500 continues to 512. If yes, the method continues to 514.

At 512, orientation detection unit 207 re-orients the image volume based on the predicted colatitude and optimal longitude. Image volume $\wp_{\alpha_0,\beta_n}$ (shown as 714 in FIG. 7b) is re-oriented to $\wp_{\alpha_1,\beta_1}$ (shown as 715 in FIG. 7d), and its orientation space is re-centered at $\alpha_1$, $\beta_1$ (i.e., point 710 in FIG. 7a moved to orientation space center 720 in FIG. 7c). Comparing FIGS. 7b and 7d, the colatitude $\hat{\alpha}_0$ (722) in $\wp_{\alpha_0,\beta_n}$ has decreased to $\hat{\alpha}_1$ (724) in $\wp_{\alpha_1,\beta_1}$. Hence, the longitude ambiguity (circles 708 and 730 in FIGS. 7a and 7c respectively) has greatly reduced.

Although Eq. 7 looks similar to the classification-based approach (Eq. 1), it has a much higher run-time efficiency due to two reasons. First, the colatitude regressor shrinks the full hypothesis space to a circle at each iteration (circle 708 in FIG. 7a). Second, along with the iterations, even the sizes of the shrunk hypothesis space reduce dramatically (circle 708 shrinks from FIG. 7a to circle 730 in FIG. 7c).

Returning to FIG. 5, the method 500 then repeats steps 504, 506, 508 and 510 to process the re-oriented image volume and predict the colatitude and optimal longitude until the predicted colatitude is less than a small pre-determined threshold.

At 514, orientation detection unit 207 outputs the resulting orientation (i.e., one or more pairs of predicted colatitude and corresponding optimal longitude). The orientation of the structure of interest may be represented by the compounded set of orientations: $\{(\alpha_1, \beta_1), (\alpha_2, \beta_2), \ldots, (\alpha_N, \beta_N)\}$, wherein a is the predicted colatitude, β is the optimal longitude, and N is the total number of iterations. The resulting orientation may be displayed in a visualization at, for example, workstation 203.

The resulting orientation may be used in various clinical applications, such as automatic planning of anatomy scans (e.g., MR, CT), tracing of vessels (e.g., aorta, spine), and so forth. In some implementations, the resulting orientation is used to trace the structure of interest. Given a starting location, (a) anatomy orientation (i.e., colatitude and longitude) of the starting location may be identified using method 500; (b) a new location on the structure of interest along the orientation may be stepped to; (c) a new orientation based on the new location may be identified using method 500; and (d) steps (b) and (c) may be iterated until a maximum number of steps or a stopping location is reached.

The present framework was evaluated on different anatomical structures, organ-systems and imaging modalities. The datasets had large variability due to different scanners (GE, Siemens and Philips), exposure times, fields of view, or contrast levels. Voxel resolutions ranged from 0.5 to 5 mm. To validate the generalization ability of the present framework, the same RF training parameters were used: number of trees (100), minimum sample size to split (20), maximum node size (10) and number of features to examine per node (100).

An experiment to detect local anatomy orientation was conducted. This experiment aimed to evaluate the performance of the present framework on local orientation detection on two anatomical structures: vertebrae and aorta segments (see FIG. 1 for orientation definition). The input image volume is a fixed-size volume of interest (VOI) containing the anatomical structure, which is roughly located at the center of the VOI. The results of the present framework (steering engine) are compared with results from (a) classification-based approach (as described in Eq. 1) and (b) present framework (or steering engine) without using the rotation-invariant integral image (RIII).

Figure 8:
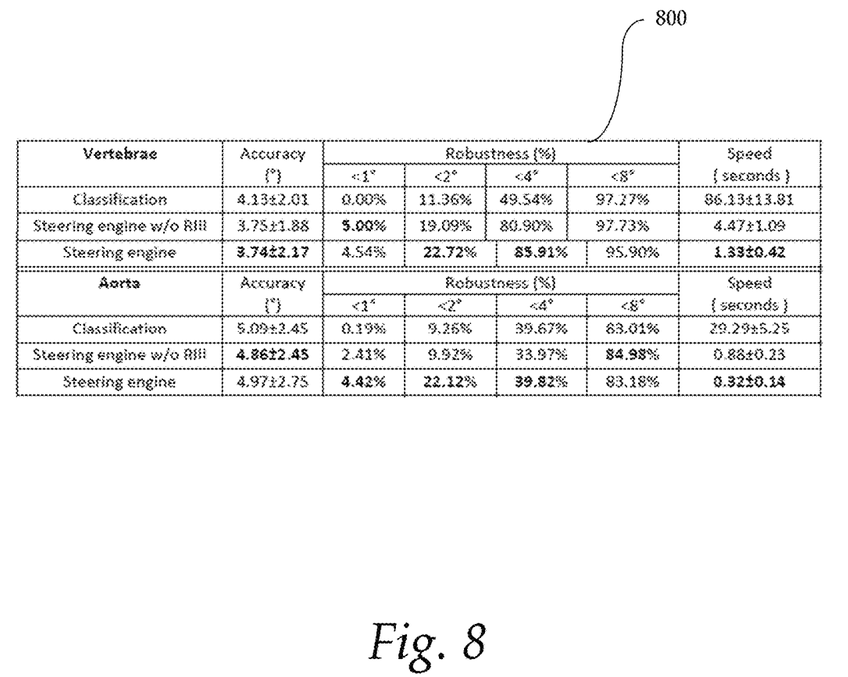
FIG. 8 shows a table of the orientation detection results.

FIG. 8 shows a table 800 of the orientation detection results on 280 vertebrae VOIs (the framework is trained from another 100 CTs). As shown, the steering engine achieved <4° average error, <8° error in ~95% VOIs with run-time speed of ~1.33 seconds (a single thread implementation on an Intel Xeon 2.3 GHz CPU). The classification-based approach achieved inferior accuracy/robustness and is ~65 times slower. Without using RIII, the accuracy is similar but the speed is ~3 times slower. A similar comparison was performed on 220 aorta VOIs (trained by another 50 CTs). Despite the lack of contrast in 50% of the VOIs, the steering engine is still accurate, robust and fast. The comparisons across the detection methods show a pattern similar to the vertebrae use case.

The steering engine was further evaluated for tracing anatomical structures. Tracing steps were tested on (a) the aorta in 100 CTs (with varying level of contrast, and some with no contrast), (b) the vertebral column in 100 CTs, and (c) the spinal cord in 200 DIXON-sequence MRs, and achieved a success rate (based on evaluation of experienced professionals) of 95%, 96% and 95%, respectively.

Figure 9:
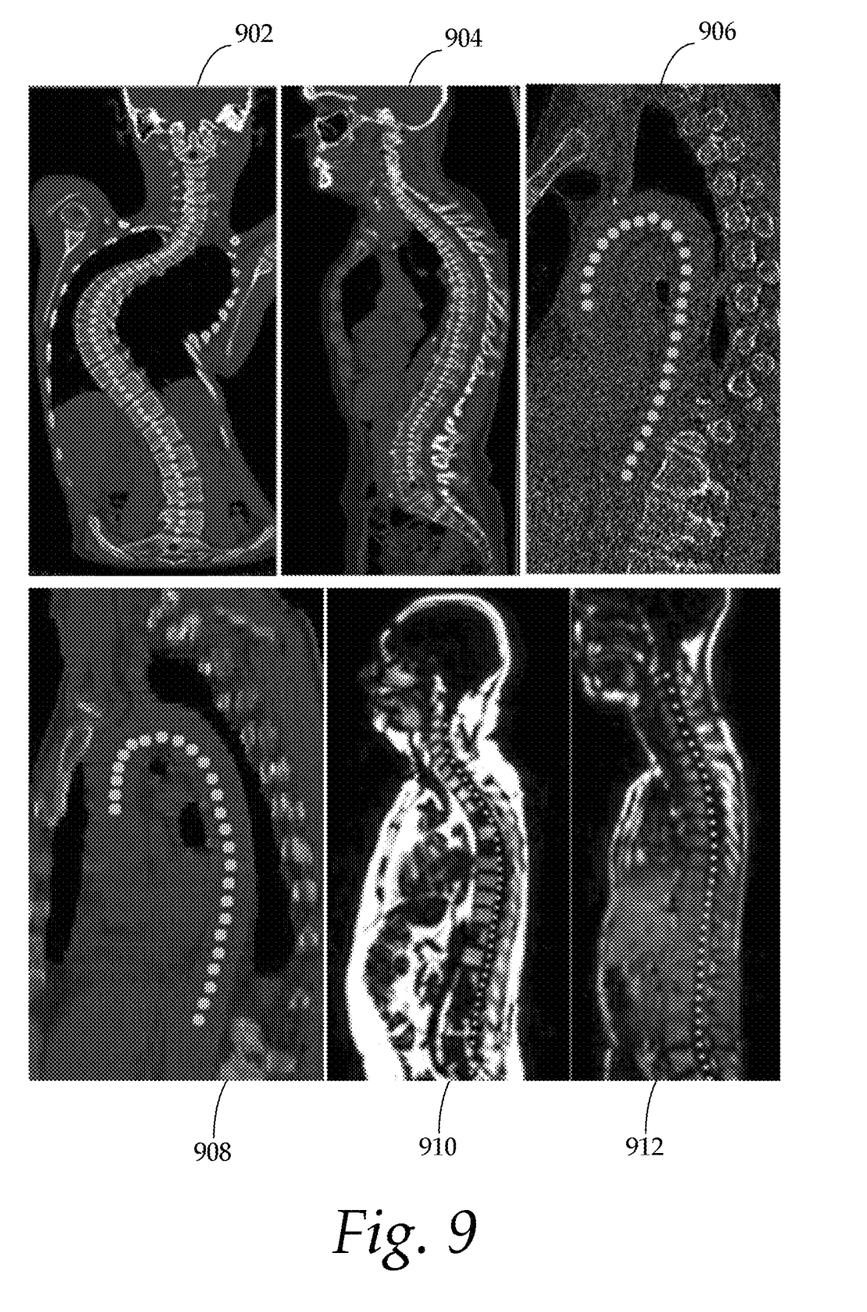
FIG. 9 shows representative example tracing results.

FIG. 9 shows representative example tracing results. Tracing was successful despite the large anatomical shape variation in a scoliosis subject (902), and a kyphosis subject (904), the lack of contrast in the CT (908), the noisy reconstruction CT kernel (906) and large shape and intensity variation surrounding the spinal cord (910 and 912).

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A non-transitory computer readable medium embodying a program of instructions executable by machine to perform operations for detecting anatomy orientation, the operations comprising:
   (i) receiving an image volume of at least a portion of a structure of interest,
   (ii) extracting appearance features from the image volume,
   (iii) applying a pre-trained regressor to the appearance features of the image volume to predict a colatitude of the structure of interest,
   (iv) determining an optimal longitude of the structure of interest corresponding to the predicted colatitude, including uniformly sampling a set of longitudes at the predicted colatitude, re-orienting the image volume to each of the sampled longitudes to generate re-oriented image volumes, applying the pre-trained regressor to each of the re-oriented image volumes to predict relative colatitudes, and selecting one of the sampled longitudes with a smallest relative colatitude as the optimal longitude,
   (v) in response to the predicted colatitude being more than a pre-determined threshold, re-orienting the image volume based on the predicted colatitude and the optimal longitude, and repeating operations (ii), (iii) and (iv), and
   (vi) outputting the predicted colatitude and the optimal longitude.

2. The non-transitory computer readable medium of claim 1 wherein the appearance features comprise Haar-like features.

3. A system for anatomy orientation detection, comprising:
   a non-transitory memory device for storing computer readable program code; and
   a processor in communication with the memory device, the processor being operative with the computer readable program code to perform operations including
   (i) receiving an image volume of at least a portion of a structure of interest,
   (ii) applying a pre-trained regressor to appearance features of the image volume to predict a colatitude of the structure of interest,
   (iii) determining an optimal longitude of the structure of interest corresponding to the predicted colatitude,
   (iv) in response to the predicted colatitude being more than a pre-determined threshold, re-orienting the image volume based on the predicted colatitude and the optimal longitude, and repeating operations (ii) and (iii) for the re-oriented image volume, and (v) outputting the predicted colatitude and the optimal longitude.

4. The system of claim 3 wherein the processor is operative with the computer readable program code to train the regressor by extracting Haar-like features from training image data and training the regressor to estimate colatitude based on the Haar-like features.

5. The system of claim 3 wherein the processor is operative with the computer readable program code to train the regressor by training random forests.

6. The system of claim 3 wherein the image volume comprises a three-dimensional image with the structure of interest located substantially at a center of the image.

7. The system of claim 3 wherein the processor is operative with the computer readable program code to extract the appearance features by extracting Haar-like features.

8. The system of claim 7 wherein the processor is operative with the computer readable program code to extract the Haar-like features using a rotation-invariant integral image.

9. The system of claim 8 wherein the rotation-invariant integral image is built based on a polar-coordinate system.

10. The system of claim 8 wherein the rotation-invariant integral image is built based on a spherical-coordinate system.

11. The system of claim 3 wherein the processor is operative with the computer readable program code to determine the optimal longitude by uniformly sampling a set of longitudes at the predicted colatitude, re-orienting the image volume to at least one of the sampled longitudes to generate re-oriented image volumes, applying the pre-trained regressor to at least one of the re-oriented image volumes to predict relative colatitudes, and selecting one of the sampled longitudes with a smallest relative colatitude as the optimal longitude.

12. The system of claim 3 wherein the anatomical structure of interest comprises at least a portion of a brain, heart, spine, vertebra, blood vessel or aorta.

13. The system of claim 3 wherein the image volume is acquired using magnetic resonance (MR) imaging, computed tomography (CT), helical CT, X-ray, angiography, positron emission tomography (PET), fluoroscopy, ultrasound, single photon emission computed tomography (SPECT), or a combination thereof.

14. The system of claim 3 wherein the processor is operative with the computer readable program code to trace the structure of interest using the predicted colatitude and the optimal longitude.

15. The system of claim 3 wherein the processor is operative with the computer readable program code to trace the structure of interest by performing operations comprising:

(vi) stepping to a new location on the structure of interest along the anatomy orientation defined by the predicted colatitude and the optimal longitude;

(vii) repeating operations (i), (ii), (iii), (iv) and (v) to generate a new colatitude and new optimal longitude for the new location; and (viii) iterating operations (vi) and (vii) until a stopping location is reached.

16. A method of detecting anatomy orientation, comprising:

(i) receiving an image volume of at least a portion of a structure of interest;

(ii) applying a pre-trained regressor to appearance features of the image volume to predict a colatitude of the structure of interest;

(iii) determining an optimal longitude of the structure of interest corresponding to the predicted colatitude;

(iv) in response to the colatitude being more than a pre-determined threshold, re-orienting the image volume based on the predicted colatitude and the optimal longitude, and repeating operations (ii) and (iii) for the re-oriented image volume; and (v) outputting the predicted colatitude and the optimal longitude.

17. The method of claim 16 further comprising extracting the appearance features by extracting Haar-like features.

18. The method of claim 17 wherein the Haar-like features are extracted using a rotation-invariant integral image.

19. The method of claim 18 wherein the rotation-invariant integral image is built based on a polar-coordinate system or a spherical-coordinate system.

20. The method of claim 16 wherein determining the optimal longitude comprises:

uniformly sampling a set of longitudes at the predicted colatitude, re-orienting the image volume to at least one of the sampled longitudes to generate re-oriented image volumes, applying the pre-trained regressor to at least one of the re-oriented image volumes to predict relative colatitudes, and selecting one of the sampled longitudes with a smallest relative colatitude as the optimal longitude.

* * * * *